(12) United States Patent
Bouaziz et al.

(10) Patent No.: US 9,689,050 B2
(45) Date of Patent: Jun. 27, 2017

(54) ROLLED STEEL THAT HARDENS BY MEANS OF PRECIPITATION AFTER HOT-FORMING AND/OR QUENCHING WITH A TOOL HAVING VERY HIGH STRENGTH AND DUCTILITY, AND METHOD FOR MANUFACTURING SAME

(75) Inventors: Olivier Bouaziz, Metz (FR); David Barbier, Metz (FR); Coralie Jung, Neunkirchen-les-Bouzonville (FR)

(73) Assignee: ARCELORMITTAL INVESTIGACIÓN Y DESARROLLO S.L., Sestao Bizkaia (ES)

( * ) Notice: Subject to any disclaimer, the term of this patent is extended or adjusted under 35 U.S.C. 154(b) by 353 days.

(21) Appl. No.: 14/343,331

(22) PCT Filed: Sep. 6, 2011

(86) PCT No.: PCT/FR2011/000490
§ 371 (c)(1),
(2), (4) Date: Jun. 2, 2014

(87) PCT Pub. No.: WO2013/034815
PCT Pub. Date: Mar. 14, 2013

(65) Prior Publication Data
US 2015/0147589 A1    May 28, 2015

(51) Int. Cl.
*C22C 38/02* (2006.01)
*C22C 38/04* (2006.01)
(Continued)

(52) U.S. Cl.
CPC .......... *C21D 8/0247* (2013.01); *B32B 15/012* (2013.01); *B32B 15/013* (2013.01);
(Continued)

(58) Field of Classification Search
None
See application file for complete search history.

(56) References Cited

U.S. PATENT DOCUMENTS 5,284,529 A * 2/1994 Shikanai ................ C22C 38/14
148/328
2003/0131909 A1    7/2003 Yoshinaga et al.
(Continued)

FOREIGN PATENT DOCUMENTS

CN     1493708 A     5/2004
CN     1714160 A    12/2005
(Continued)

OTHER PUBLICATIONS

Machine-English translation of JP 2010-150667, Murakami Hidekuni, Jul. 8, 2010.*
(Continued)

*Primary Examiner* — Deborah Yee
(74) *Attorney, Agent, or Firm* — Davidson, Davidson & Kappel, LLC

(57) ABSTRACT

A rolled steel sheet or blank is provided, the composition of which comprises the elements listed below in percent by weight: $C \leq 0.1\%$; $0.5\% \leq Mn \leq 7\%$; $0.5\% \leq Si \leq 3.5\%$; $0.5\% < Ti \leq 2\%$; $2\% < Ni \leq 7\%$; $Al \leq 0.10\%$; $Cr \leq 2\%$; $Cu \leq 2\%$; $Co \leq 2\%$; $Mo \leq 2\%$; $S \leq 0.005\%$; $P \leq 0.03\%$; $Nb \leq 0.1\%$; $V \leq 0.1\%$; $B < 0.005\%$; $N \leq 0.008\%$, and the silicon and titanium contents are such that:

$$Si + Ti \geq 2.5\%, \quad \frac{Ti}{Si} \geq 0.3$$

the remainder of the composition consisting of iron and unavoidable impurities resulting from processing. A method for the fabrication of a part for a land motor vehicle from the sheet or blank by hot stamping is also provided. The microstructure of the part consisting essentially of marten-
(Continued)

site and intermetallic precipitates of type $Fe_2TiSi$ with an area percentage between 1 and 5% intermetallic precipitates.

28 Claims, 2 Drawing Sheets

(51) Int. Cl.

| | |
|---|---|
| C22C 38/08 | (2006.01) |
| C22C 38/28 | (2006.01) |
| C22C 38/34 | (2006.01) |
| C22C 38/58 | (2006.01) |
| C21D 8/04 | (2006.01) |
| C21D 8/02 | (2006.01) |
| C21D 6/02 | (2006.01) |
| C22C 38/14 | (2006.01) |
| C22C 38/00 | (2006.01) |
| C22C 38/06 | (2006.01) |
| C21D 7/13 | (2006.01) |
| C21D 9/46 | (2006.01) |
| C21D 1/22 | (2006.01) |
| C21D 1/673 | (2006.01) |
| C23C 2/02 | (2006.01) |
| B32B 15/01 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/52 | (2006.01) |
| C22C 38/54 | (2006.01) |
| C23C 2/06 | (2006.01) |
| C23C 2/12 | (2006.01) |

(52) U.S. Cl.
CPC ............... *C21D 1/22* (2013.01); *C21D 1/673* (2013.01); *C21D 6/02* (2013.01); *C21D 7/13* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/14* (2013.01); *C22C 38/34* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *C23C 2/02* (2013.01); *C23C 2/06* (2013.01); *C23C 2/12* (2013.01); *C21D 2211/004* (2013.01); *C21D 2211/008* (2013.01); *Y10T 428/12757* (2015.01); *Y10T 428/12799* (2015.01)

(56) References Cited

U.S. PATENT DOCUMENTS

| | | |
|---|---|---|
| 2004/0173288 A1 | 9/2004 | Berglund |
| 2006/0137780 A1 | 6/2006 | Beguinot et al. |

FOREIGN PATENT DOCUMENTS

| | | | |
|---|---|---|---|
| CN | 1735698 | A | 2/2006 |
| GB | 1 490 535 | A | 11/1977 |
| JP | 09184045 | A | 7/1997 |
| JP | 2004346415 | A | 12/2004 |
| JP | 2005126733 | A | 5/2005 |
| JP | 2005205477 | A | 8/2005 |
| JP | 2010-150667 | * | 7/2010 |
| JP | 2010222644 | A | 10/2010 |
| WO | 0136699 | A1 | 5/2001 |
| WO | 2009145563 | A2 | 12/2009 |

OTHER PUBLICATIONS

"Comptes Rendus Hebdomadaires des Séance de L'Académie des Sciences." C.R. Académie de Sciences Paris, t. 276 (1973): 1509-1512.

Watson, J.D. and G.G. Brown. "The Strength and Ductility of Precipitation—Hardened Fe—Si—Ti Alloys." Metal Science, vol. 8 (1974): 9-20.

* cited by examiner

ROLLED STEEL THAT HARDENS BY MEANS OF PRECIPITATION AFTER HOT-FORMING AND/OR QUENCHING WITH A TOOL HAVING VERY HIGH STRENGTH AND DUCTILITY, AND METHOD FOR MANUFACTURING SAME

This invention relates to the fabrication of rolled steel parts that have mechanical properties of high strength and excellent formability, in particular after hot stamping and/or quenching in the tool, followed by a thermal hardening treatment.

BACKGROUND

The making available of this strong material is in response to a pressing demand for a reduction of greenhouse gas emissions, increasingly stringent automobile safety requirements and the price of fuel. These three constraints have pushed the designers and manufacturers of land motor vehicles to use steels with increasingly higher mechanical strength in the body to reduce the thickness of the parts and thus the weight of the vehicles while preserving and even improving the mechanical strength of the structures. Center pillars, bumper crossbars, anti-intrusion parts and other safety parts are examples of parts that require high mechanical strength to perform their primary function and sufficient formability for the shaping of the part in question.

The shaping of steels with a high level of mechanical strength requires a well-known sequence consisting of the genesis of a parent phase austenite, the transformation of the austenite into bainite and/or martensite and optionally the adjustment of the mechanical properties and in particular the hardness of the latter by various heat or thermo-mechanical treatments, depending on the intended functional behavior of the final part.

The mechanical behavior of the martensite is related in particular to the carbon content. The greater the amount of carbon in the martensite, the harder the martensite will be.

The article entitled "Martensite in steel: Strength and structure" by G. Krauss, published in "Materials Science and Engineering" A273-275 (1999), pages 40 to 57, illustrates the link between the carbon content and the hardness of the martensite, this relationship being quasi-linear with the square root of the carbon content in percent by weight. Mechanical strengths significantly greater than 1500 MPa can be achieved by the combination of an increase in the carbon content and the addition of different elements that promote solid solution hardening or precipitation hardening. However, the ductility of a material that has such high strength is prohibitive when it comes to forming a structural part, so that the currently known optimum combination consists of obtaining the high strength level after the forming of the part, via a forming process that can be done hot. It is highly advantageous to have a low strength before the forming and thus an improved ductility to facilitate the forming.

The approach mentioned above is described in patent application WO2009145563 which relates to very high-strength steel sheet that has excellent heat treatment properties, whereby this sheet contains, in % by weight, C: 0.2 to 0.5%, Si: 0.01 to 1.5%, Mn: 0.5 to 2.0%, P: 0.1% or less (but not 0%), S: 0.03% or less (but not 0%), soluble Al: 0.1% or less (but not 0%), N: 0.01 to 0.1%, and Cr: 0.1% to 2.0%, the remainder consisting of iron and unavoidable impurities. This steel sheet has a tensile strength, measured before hot forming, less than or equal to 800 MPa. The sheet is hot formed and rapidly cooled so that it has a tensile strength greater than or equal to 1800 MPa.

However, the levels of carbon described in this document (0.2% to 0.5%) are currently known to be the source of problems in terms of spot welding for the body-in-white of land motor vehicles, i.e. the assembled structure.

Patent application WO200136699 further relates to a composition and a fabrication method for precipitation hardened martensitic stainless steel products, the composition of which contains at least 0.5% by weight Cr and at least 0.5% by weight Mo, whereby the sum of Cr, Ni and Fe exceeds 50%. The microstructure obtained contains at least 50% martensite and the steel is then subjected to an aging treatment between 425 and 525° C. to obtain a precipitation of quasi-crystalline particles. This material meets the requirements of corrosion resistance, high strength and good toughness. The example of the invention is a steel that has an elastic limit of 1820 MPa and a total elongation of 6.7%. If the material obtained is very strong, with a mechanical strength in the range of 1800 MPa, a complex part cannot be formed with such a high-strength sheet, because it is known that the necessary corollary of high strength is relatively low ductility, which leaves little room for maneuver for parts that require formability.

SUMMARY OF THE INVENTION

It is an object of the present invention to provide a steel that can be easily welded under industrial conditions, has high mechanical strength and ductility properties in the part that is hot-stamped after a hardening heat treatment. To accomplish this, the invention aims to make available a rolled steel which, after hot stamping and a precipitation heat treatment, has an elastic limit greater than or equal to 1300 MPa and an elongation at fracture greater than or equal to 4%. The invention further aims to eliminate the need for the addition of excessive quantities of expensive alloy elements to achieve these properties.

In the framework of this invention, a blank means the piece that is obtained by cutting a sheet, and a part means the result of the stamping of a sheet or a blank.

The present invention provides a rolled steel sheet or blank, the composition of which comprises, expressed in percent by weight: $C \leq 0.1\%$; $0.5\% \leq Mn \leq 7\%$; $0.5\% \leq Si \leq 3.5\%$; $0.5\% < Ti \leq 2\%$; $2\% < Ni \leq 7\%$; $Al \leq 0.10\%$; $Cr \leq 2\%$; $Cu \leq 2\%$; $Co \leq 2\%$; $Mo \leq 2\%$; $S \leq 0.005\%$; $P \leq 0.03\%$; $Nb \leq 0.1\%$; $V \leq 0.1\%$; $B < 0.005\%$; $N \leq 0.008\%$, and the silicon and titanium contents are such that:

$$Si + Ti \geq 2.5\% \text{ and } \frac{Ti}{Si} \geq 0.3$$

the remainder of the composition consisting of iron and the unavoidable impurities resulting from processing.

In one preferred embodiment of the invention, the sheet or the blank has the following composition, expressed in percent by weight: $C \leq 0.050\%$; $3\% \leq Mn \leq 5\%$; $1.0\% \leq Si \leq 3.0\%$; $0.5\% \leq Ti \leq 1.5\%$; $2.5\% \leq Ni \leq 3.5\%$; $Al \leq 0.10\%$; $Cr \leq 1\%$; $Cu \leq 0.05\%$; $Co \leq 1\%$; $Mo \leq 2\%$; $S \leq 0.005\%$; $P \leq 0.03\%$; $Nb \leq 0.1\%$; $V \leq 0.1\%$; $B < 0.005\%$; $N \leq 0.008\%$, and the silicon and titanium contents are such that:

$$Si + Ti \geq 2.5\% \text{ and } \frac{Ti}{Si} \geq 0.3$$

the remainder of the composition consists of iron and the unavoidable impurities resulting from processing.

An additional object of the invention is a part fabricated from the sheet or blank, the microstructure of which contains at least 95% martensite and intermetallic precipitates of the type $Fe_2TiSi$.

In one preferred embodiment of the invention, the area percentage of the intermetallic precipitates of type $Fe_2TiSi$ of the part is between 1 and 5%.

In one preferred embodiment of the invention, the average radius of the precipitates is between 1 and 10 nanometers.

In one preferred embodiment, the elastic limit of the steel part is greater than or equal to 1300 MPa and the elongation at fracture is greater than or equal to 4%.

In one preferred embodiment, the steel part includes a coating that contains zinc, a zinc alloy or a zinc-based alloy.

In one variant of the invention, the steel part includes a coating that contains aluminum, an aluminum alloy or an aluminum-based alloy.

An additional object of the invention is a method for the fabrication of a steel part comprising the successive steps listed below:

a rolled steel sheet having the composition indicated above is procured, the microstructure of which contains less than 1% intermetallic precipitates of the type $Fe_2TiSi$ in area percentage, then the sheet is cut to obtain a blank which can optionally be welded. The blank is then brought to a temperature $T_\gamma$ for a length of time $t_\gamma$ in a furnace, so that the structure of the steel becomes fully austenitic. The blank can then optionally be removed and hot-stamped at a temperature higher than the temperature Ms. The part is then cooled in air or quenched in the tool at a rate $V_{refl}$ to obtain an essentially martensitic structure from the austenitic parent structure; the cooling following the stamping will therefore be to a temperature below Ms. An "essentially martensitic" structure means a structure that contains at least 95% martensite. Finally, a heat treatment that causes the precipitation of intermetallics of type $Fe_2TiSi$ in an area percentage between 1% and 5% is then performed at the temperature $T_{OA}$ for a length of time $t_{OA}$ to harden the part and give it the mechanical properties specified in the framework of the invention.

An additional object of the invention is a method for the fabrication of a steel part comprising the successive steps in which a rolled steel sheet having the above composition is procured, the microstructure of which contains at least 1% intermetallic precipitates of the type $Fe_2TiSi$ in area percentage, and then the sheet is cut to obtain a blank that can optionally be welded. The blank is then cold-stamped to obtain a part or a preform of the specified final part. The part or preform is then reheated at a rate $V_{c1}$ in a furnace at a certain temperature $T_\gamma$ for a length of time $t_\gamma$ to obtain a fully austenitic structure, before optionally being removed and then hot-stamped to give it its final shape. The part is then cooled in air or quenched in the tool at a rate $V_{refl}$ to obtain an essentially martensitic structure from the austenitic parent structure; the cooling following the stamping will therefore be to a temperature below Ms. Finally, a heat treatment that causes the precipitation of intermetallics of type $Fe_2TiSi$ in an area percentage between 1% and 5% is then performed at the temperature $T_{OA}$ for a length of time $t_{OA}$ to harden the part and give it the mechanical properties specified in the framework of the invention.

In one preferred embodiment, the temperature $T_\gamma$ is between 700 and 1200° C., and particularly preferably between 880 and 980° C.

The hold time $t_\gamma$ is preferably between 60 and 360 seconds.

The cooling rate after hot stamping, $V_{refl}$ between $T\gamma$ and the martensitic transformation temperature $M_s$ is preferably between 10° C./s and 70° C./s.

In one particular embodiment, the heat treatment to cause the precipitation of intermetallics will consist of heating the part at a certain rate $V_{c2}$ to the hold temperature $T_{OA}$ for a period $t_{OA}$ and then cooling the part at a rate $V_{ref2}$ greater than 1° C./s to impart the specified mechanical properties to the part. Particular preference is given to air cooling.

In one preferred embodiment, the hold temperature $T_{OA}$ is between 400 and 600° C.

In one preferred embodiment, the hold time $t_{OA}$ at $T_{OA}$ is between 30 and 600 minutes.

An additional object of the invention is the part, heated to the temperature $T_{OA}$ for a length of time $t_{OA}$, then coated with zinc, a zinc alloy or a zinc-based alloy.

An additional object of the invention is the part, heated to the temperature $T_{OA}$ for a length of time $t_{OA}$, then coated with aluminum, an aluminum alloy or an aluminum-based alloy.

An additional object of the invention is the use of the part for the fabrication of structural or safety parts for land motor vehicles. Anti-intrusion parts are a particular aim of the invention.

DETAILED DESCRIPTION

Figure 1:
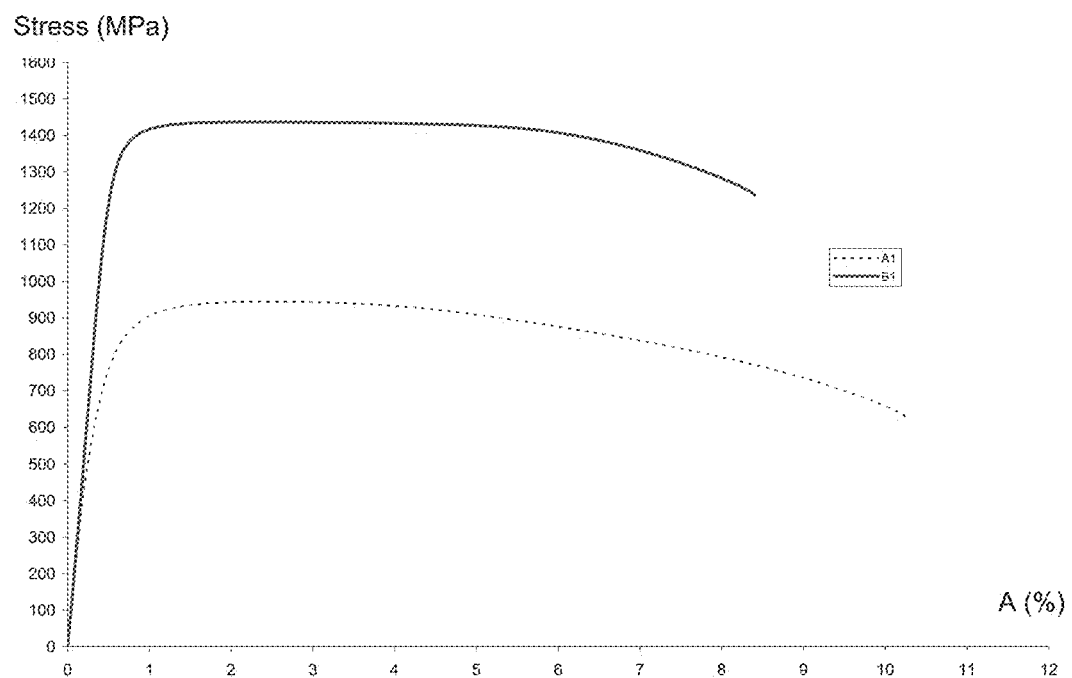
FIG. 1: Shows two conventional tensile strength curves illustrating the mechanical behavior of the steel.

Other characteristics and advantages in the framework of the invention are explained in greater detail below, with possible reference to the accompanying figures in which:

FIG. 1: shows two conventional tensile strength curves illustrating the mechanical behavior of the steel according to an embodiment of the invention produced by casting 1, test A, in Table 3 of the examples. The dotted curve indicates the mechanical behavior under a uni-axial tensile force after $t_\gamma$=180 seconds of austenitization at $T_\gamma$=950° C. followed by a cooling $V_{refl}$ of 30° C./s to the ambient temperature, which is below $M_s$. The solid curve indicates the mechanical behavior under a uni-axial tensile force after the heat treatment to induce the precipitation of intermetallics in the nanometer range at $T_{OA}$=500° C. for $t_{OA}$=180 minutes.

Figure 2:
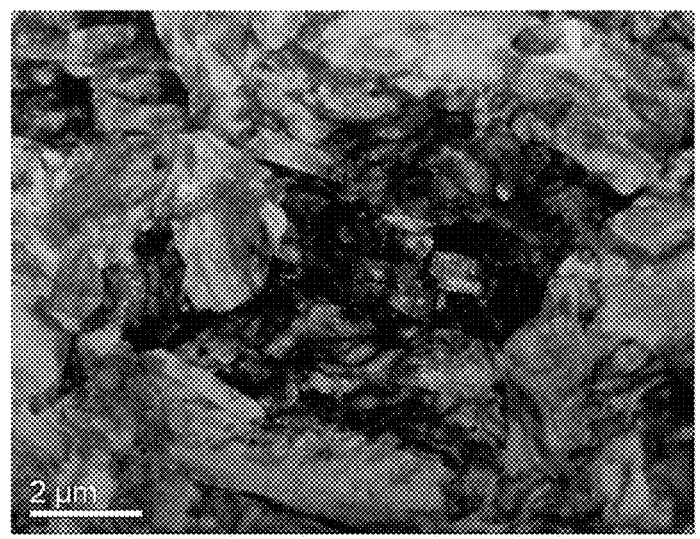
FIG. 2: An illustration of the fully martensitic intermediary microstructure after cooling $V_{refl}$ at 30° C./s.

FIG. 2: a photograph of the fully martensitic intermediary microstructure after cooling $V_{refl}$ at 30° C./s. The figure also illustrates the microstructure corresponding to the dotted curve in FIG. 1.

Figure 3:
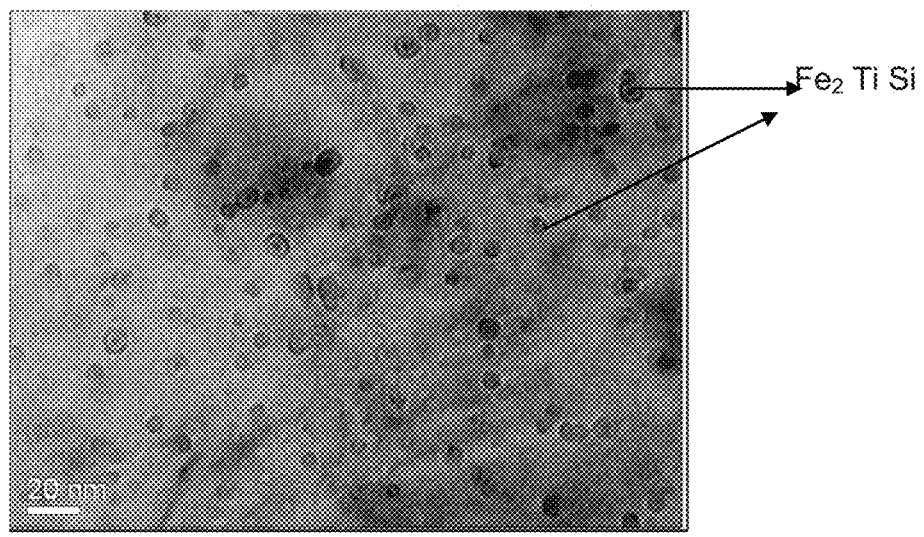
FIG. 3: An illustration of the microstructure of a steel in accordance with an embodiment the invention after the heat treatment to induce the precipitation of intermetallics.

FIG. 3: a photograph of the microstructure of a steel according to an embodiment of the invention after the heat treatment to induce the precipitation of intermetallics. The black arrows in the photograph indicate the $Fe_2TiSi$ precipitates. The figure also illustrates the microstructure corresponding to the solid curve in FIG. 1.

For the chemical composition of the steel according to embodiments of the invention, the amounts indicated refer to percent by weight.

The carbon content must be less than or equal to 0.1% by weight, because above this limit the toughness of the low-carbon martensite which constitutes the matrix of the steel according to embodiments of the invention begins to decrease. It is also desirable to prevent the formation of titanium carbides (TiC), which have an adverse effect on the formability and tie up the titanium. It is preferable to limit the carbon content to 0.05% to achieve the maximum possible reduction in the risk of obtaining a brittle martensite.

The manganese content will be between 0.5 and 7%. This element plays a deoxidizing role and advantage is taken of its hardening properties as a result of the formation of a solid solution to achieve the specified mechanical properties. On the other hand, its positive effect on hardenability is also utilized to obtain a martensitic structure from the parent austenite with, for example, an air cooling cycle. Therefore, a minimum content of 0.5% is recommended in the framework of embodiments of the invention. Nevertheless, an upper limit of 7% is set in the framework of embodiments of the invention to prevent brittle behavior of the material at ambient temperature. Preferably, a lower limit of 3% and an upper limit of 5% will be observed to obtain optimal results with respect to a goal of the invention.

With regard to silicon, a target content is between 0.5 and 3.5%. This element has a positive effect on the hardenability of the steel and is used in the framework of embodiments of the invention to promote fine precipitation of intermetallics of the type $Fe_2SiTi$. A minimum concentration of 0.5% is required to obtain a sufficient quantity of Si to form the intermetallic $Fe_2SiTi$ precipitates. Nevertheless, silicon is known to cause brittleness, which makes rolling difficult, and above 3.5%, rolling can result in fracturing which can interrupt the industrial process. Preferably, a silicon content between 1.0% and 3.0% inclusive will be recommended to obtain optimal results in terms of size, surface density and distribution of $Fe_2TiSi$ intermetallic precipitates.

The quantity of titanium will be between 0.5 and 2% to balance the ternary Fe—Si—Ti system, i.e. to have a stoichiometry favorable to the formation of $Fe_2TiSi$ compounds according to embodiments of the invention. A minimum content of 0.5% titanium is necessary to form sufficient fine intermetallic $Fe_2SiTi$ precipitates. Nevertheless, in quantities greater than 2%, the risk of forming coarse titanium carbides becomes too great, because these carbides have an unfavorable effect on formability and tie up the titanium. The maximum titanium content is therefore specified at 2%. Preferably, a titanium content between 0.5% and 1.5% inclusive will be recommended to obtain optimal results in terms of size, surface density and distribution of $Fe_2TiSi$ intermetallic precipitates.

The nickel content will be between 2 and 7%. This element makes it possible to increase the size of the austenitic range, to improve the anti-corrosion properties, and to increase the toughness of the material. Nevertheless, the cost of this element requires limiting its contents to 7%. Below 2%, the positive effects described above are less pronounced. Preferably, the nickel content will be between 2.5 and 3.5% to achieve goals specified by the invention.

In the context of embodiments of the invention, the aluminum content will be limited to 0.10%. Complete austenitization is required during heating to the temperature $T_y$ so that the matrix of the steel becomes entirely austenitic, although aluminum is an element known to be very alphagenic, i.e. it will tend to raise the temperature at which the fully austenitic range is achieved. Other characteristics, such as more difficult casting properties of steels that contain large amounts of aluminum, are prohibitive in terms of embodiments of the invention, as a result of which this principle characteristic has spurred the inventors to limit the aluminum content to 0.10%

The chromium content is less than or equal to 2%. This element can, in the framework of embodiments of the invention, be an expensive substitute for manganese on account of its principal effect on hardenability, or an additional hardening element. The chromium content will preferably be limited to 1%.

The copper content is less than or equal to 2%. This element could also be an attractive but expensive substitute for manganese, although the risks of surface cracking may then appear and have an adverse effect on the hot forging properties. The copper content will therefore preferably be limited to 0.05%.

The cobalt content will be limited to 2%. The length of the intermetallic precipitation heat treatment which must take place after the final forming of the structural part can be reduced by the addition of this element which also has a positive effect on toughness. Therefore cobalt can be added to accelerate the precipitation kinetics of hardening intermetallics, although this element is expensive and its usage is therefore limited to 2 or even 1%.

The addition of molybdenum is limited to 2% in the framework of embodiments of the invention because it is an expensive element, although it can also be added for its contribution to increasing the solid solution strength or for its positive effect on hardenability.

The boron content must be strictly less than 0.005%, because above this level there is a risk of forming $TiB_2$ in the liquid stage, or even boron nitrides. Because this type of precipitate is significantly less hardening than $Fe_2TiSi$, a portion of the titanium would therefore no longer be available to sufficiently harden the steel.

The nitrogen content is limited to 0.008% to avoid the formation of coarse titanium nitrides TiN on account of the undesirable effect of this inclusion on formability.

The micro-alloy elements such as niobium and vanadium are present in concentrations limited to 0.1%. They can be used to reduce the austenitic grain size to improve mechanical strength. Nevertheless, because the range of precipitation of these elements occurs at a temperature higher than that of the martensitic transformation during cooling, they cannot be used for precipitation hardening during the heat treatment. That would risk obtaining a hard steel with low formability even before stamping, because it would contain niobium-based and vanadium-based precipitates which reduce the ability to stamp the part without the appearance of cracks.

Elements such as sulfur and phosphorus are limited to the level of impurities on the industrial scale and therefore have the maximum limits indicated below: 0.005% and 0.03%.

The matrix of the sheets and blanks according to embodiments of the invention is essentially martensitic. This martensite has a carbon concentration equal to the nominal concentration, which is called low-carbon martensite in the remainder of this disclosure. Up to 5% residual austenite in surface percentage can also be tolerated in the microstructure.

This matrix contains intermetallic precipitates of type $Fe_2TiSi$. To achieve the targets specified by embodiments of the invention, it is necessary to have a particular size, density and distribution of these intermetallic precipitates of type $Fe_2TiSi$ which are obtained in the part as a result of the precipitation heat treatment and by means of the combination described below:

the sum of the content by weight of silicon and titanium is greater than or equal to 2.5%.

the ratio of the content by weight of titanium to that of silicon is greater than or equal to 0.3.

The sheets according to embodiments of the invention can be fabricated by any appropriate process. However, it is preferable to utilize the method according to embodiments of the invention, which comprises a plurality of steps.

First, a sheet or blank that has been cut from the sheet is procured, which has a composition according to embodiments of the invention. The sheet can be fabricated, for example, by casting liquid steel which, once it has cooled, produces a slab. The slab is then reheated to a temperature between 1100° C. and 1275° C. for a length of time sufficient for the temperature to be uniform at all points of the slab. After the reheating and once the temperature in the slab is uniform, the slab is hot-rolled at a mill exit temperature $T_{fl}$ which is greater than or equal to 890° C., whereby the objective is for the temperature to be above $Ar_3$, because the rolling must be performed in the austenitic range.

Following this hot rolling, an important step in embodiments of the invention consists of cooling the steel to a coiling temperature $T_{bob}$ which is below 400° C. to prevent any premature precipitation of intermetallics. The cooling rate $V_{bob}$ to $T_{bob}$ must be between 30° C./s and 150° C./s. The steel is then optionally coiled by cooling in air from the temperature $T_{bob}$ to the ambient temperature.

In one variant of the invention, the blank can be welded to other steel components to form a more complex structure before austenitization and stamping. In fact, it is known that, depending on the application, there can be certain regions of the part that may be required to have mechanical properties or thicknesses that are different from the rest of the part. For example, with the principal objective of saving weight and increasing efficiency, certain parts can be made of different steels and/or have different thicknesses, and can be assembled in the form called "tailored blanks" or in the form of blanks with variable thicknesses produced by flexible rolling. The welding can be performed using all existing technologies (laser welding, arc welding, resistance spot welding etc.), while the variable-thickness blank requires hot rolling or flexible cold rolling with a variable gap between the rolling mill rolls.

In an additional variant of the invention, before the heating of the sheet or of the blank, the blank can be cold formed to partly approximate the shape of the final part or the part can already be cold formed if there are no particular problems that require hot stamping. Finally, this cold deformation step can also make it possible to fabricate a preform that is more suitable for the subsequent cooling tool, which will also make possible a better contact between the tool and the part so that the cooling can be performed more uniformly and more rapidly. The purpose of this cold forming can also be simply to further reduce the thickness of the steel.

Following these two variant steps in the process, which are both optional and can be combined, the sheet or the blank is heated in a heat treatment furnace to a temperature which is called the austenitization temperature $T_\gamma$ and is higher than Ac3. This latter parameter corresponds to the temperature beginning at which the microstructure of the material is fully austenitic. The austenitic annealing temperature $T_\gamma$ must be between 700° C. and 1200° C. To promote homogenization, the steel or the zone to be heated in the austenitic range will preferably be held at the temperature $T_\gamma$ for a length of time $t_\gamma$ between 60 seconds and 360 seconds. A longer time would be economically unprofitable on the industrial scale because the primary objective is to achieve a uniform temperature $T_\gamma$ of the blank. The austenitic annealing temperature $T_\gamma$ will preferably be between 880° C. and 980° C.

The blank or the sheet thus heated to the temperature $T_\gamma$ for the time $t_\gamma$ can be optionally removed from the furnace and then hot formed to obtain the final part. If a cold preform has already been fabricated, the final shape is then impressed and the contact between the part and the cooling tool will be better.

Preferably, the average grain size of the parent austenite obtained after heating above $Ac_3$ and before hot stamping is less than 30 µm.

The steel exhibits stable mechanical properties between 10 and 70° C./s, which has the industrial advantage that it makes it possible to use the same cooling or quenching tool, regardless of the thickness of the parts to be cooled. In addition, cooling by holding in the tool achieves better control of the geometry of the part.

A technology that eliminates the transfer of the sheet and makes possible the stamping immediately after the heating and homogenization of the temperature in the furnace represents an advantage in terms of industrial productivity.

Without this technology, once the blank has been transferred into the press for the stamping, the hot stamping tool also makes possible cooling by conduction and the rate of cooling as well as the uniformity of the cooling are a function of the thickness of the sheet, the temperature $T_\gamma$, the transfer time between the furnace and the hot forming tool and the cooling system of the tool. The hardenability of the steel according to embodiments of the invention is such that cooling in air suffices to form an essentially martensitic structure at ambient temperature and to stabilize less than 5% austenite. That implies that any rate greater than that of air cooling to a temperature Ms makes it possible to form the essentially martensitic structure, as a result of which a limit of 70° C./s has been set to improve homogeneity and to take the realities of industrial production into consideration. In addition, cooling by holding in the tool has the advantage that it improves control of the shape of the part. The temperature of the beginning of the martensitic transformation will be calculated by the formula published by K. Ishida in "Journal of Alloys Compound. 220" (1995), page 126.

$$Ms(° C.)=545-33000\times C_c\times C_{Al}+700\times C_{Co}-1400\times C_{Cr}-1300\times C_{Cu}-2300\times C_{Mn}-500\times C_{Mo}-400\times C_{Nb}-1300\times C_{Ni}-700\times C_{Si}+300\times C_{Ti}+400\times C_V,$$

whereby the contents are indicated in percent by weight.

The rate of cooling to below the temperature Ms will influence the mechanical properties of the martensite by tempering the martensite, reducing its hardness in connection with the slowness of the cooling to below Ms. It is advisable to have a cooling rate at least equal to cooling in air. $T_{int}$ is the temperature below $M_s$ at which the cooling after the stamping stops and occurs before the intermetallic precipitation heat treatment step.

The sheet or the blank is then subjected to a heat treatment to promote the precipitation of intermetallics in the nanometer range which harden in the form of $Fe_2TiSi$. This heat treatment is performed at a temperature $T_{OA}$ between 400 and 600° C., whereby this temperature interval corresponds to the above-mentioned precipitates. The hold at this temperature $T_{OA}$ will be for a length of time $t_{OA}$ which is between 30 and 600 minutes. The step of cooling the part to a temperature below $M_s$ can be followed directly by the heat treatment described above, without reaching the ambient temperature. This hardening heat treatment has the advantage that it is performed after the hot stamping or cold stamping, and the mechanical strength before intermetallic precipitation is less than 1000 MPa as illustrated in FIG. 1 with the dotted curve. This makes it possible to have greater ductility than with a steel that has a hardened structure even before stamping, as a result of which complex parts can be produced.

The microstructure according to embodiments of the invention therefore comprises a low-carbon martensitic matrix present in the form of islands with a lamellar configuration, in the interior of which there is a precipitation of type $Fe_2TiSi$ which also has an area percentage between 1 and 5% and an average precipitate radius between 1 and 10 nm. For this latter criterion, the precipitate is likened to a circle, the radius of which is measured.

The parts thus formed can be assembled by welding into other components of different sizes, shapes, thickness and composition to form a larger and more complex structure. The parts thus formed can then be dip-coated or coated by electrolysis with an appropriate coating if they are required to have specific anti-corrosion or aesthetic properties.

Additional benefits conferred by embodiments of the invention are demonstrated by the tests described below, which are presented as non-restrictive examples.

Three chemical compositions were cast, the first of which corresponds to an embodiment the invention (steel 1) and the other two (steels 2 and 3) of which were used as references. The objective is to demonstrate the ability of embodiments of the invention to achieve an object of the invention, which is an inexpensive grade that makes it possible to achieve an elastic limit greater than or equal to 1300 MPa, as well as an elongation at fracture greater than or equal to 4%. Steel No. 2 is a maraging steel. Steel No. 3 is a steel for hot stamping designated 22MnB5.

Table 1 presents the chemical compositions of the steels cast in percent by weight; contents of elements that do not correspond to embodiments of the invention are underlined.

Table 2 presents the sum Si+Ti, the ratios Si/Ti and the martensite transformation temperatures for the chemical compositions presented in Table 1.

TABLE 2

| Steels | Si + Ti | Ti/Si | Ms (° C.) |
|---|---|---|---|
| 1 | 2.96 | 0.49 | 398 |
| 2 | 0.49 | 9.36 | 343 |
| 3 | 0.3 | 0.15 | 440 |

These three compositions were cast to form slabs which were then subjected to rolling under the conditions described below:

Reheating to 1200° C. for 45 minutes.

90% reduction of thickness by hot rolling with a mill exit temperature of 900° C.

Cooling of the steel to 200° C. at the exit from the final rolling mill roll.

The cooling rate from the mill exit temperature $T_{fl}=900°$ C. to the coiling temperature $T_{bob}$ of 200° C. was 100° C. per second, followed by cooling in air.

The oxidized hot-rolled sheet was pickled at the ambient temperature using a chemical pickling process.

The thickness of the sheet was then reduced by 70% by cold rolling. The thickness of the sheets obtained was between 0.8 and 2.4 mm.

The sheets thus obtained were then cut to obtain blanks, these blanks were then subjected to the heat treatments summarized in Table 3, the columns in which indicate:

the heating rate: $V_{C1}$ in ° C./s, the austenitization temperature Tγ in ° C., the austenitization time tγ in seconds, the average cooling rate $V_{refl}$ in ° C./s, the temperature $T_{int}$ at which the cooling $V_{refl}$ was stopped, the second heating to perform the precipitation heat treatment $V_{C2}$ in ° C./s,

TABLE 1

| Steels | C | Mn | Si | Ti | Ni | Al | Cr | Cu |
|---|---|---|---|---|---|---|---|---|
| 1 | 0.03 | 3.76 | 1.99 | 0.97 | 3.01 | 0.01 | <0.002 | 0.0007 |
| 2 | 0.006 | <0.2 | 0.047 | 0.44 | 18.24 | 0.087 | 0.053 | 0.053 |
| 3 | 0.23 | 1.18 | 0.26 | 0.04 | 0.01 | 0.053 | 0.18 | 0.02 |

| Steels | Co | Mo | S | P | Nb | V | B | N |
|---|---|---|---|---|---|---|---|---|
| 1 | <0.002 | 0.001 | <0.001 | 0.002 | <0.002 | <0.002 | 0.0005 | 0.0039 |
| 2 | 8.86 | 5.03 | <0.001 | <0.02 | <0.002 | <0.002 | <0.001 | <0.002 |
| 3 | <0.002 | 0.002 | 0.0008 | 0.0125 | <0.002 | 0.0007 | 0.0029 | 0.0039 | the precipitation hold temperature $T_{OA}$ in ° C.,
the precipitation hold time $t_{OA}$ in minutes,
the final air cooling $V_{ref2}$.

TABLE 3

| Test | Steels | $V_{C1}$ (° C./s) | $T\gamma$ (° C.) | $t_\gamma$ (sec) | Vref1 (° C./s) | $T_{int}$ (° C.) | $V_{C2}$ (° C./s) | $T_{OA}$ (° C.) | $t_{OA}$ (min) | $V_{ref2}$ |
|---|---|---|---|---|---|---|---|---|---|---|
| A | 1 | 5 | 950 | 300 | 30 | 25 | 5 | 500 | 180 | air |
| B | 2 | 5 | 950 | 300 | 30 | 200 | 5 | 480 | 180 | air |
| C | 3 | 5 | 950 | 300 | 30 | 25 | 5 | 500 | 30 | air |
| D | 3 | 5 | 950 | 300 | 30 | 25 | 5 | 400 | 30 | air |
| E | 3 | 5 | 950 | 300 | 30 | 25 | 5 | 600 | 30 | air |

In the steels in the tests A and B, the blank was stamped after austenitization at 950° C. for 5 minutes and before cooling Vref1. That made it possible to form a center pillar and to illustrate the hot-stamping capacity of the steels according to embodiments of the invention. Following that, a heat treatment at 500° C. for 3 hours (180 minutes) made it possible to achieve a level of the elastic limit greater than 1300 MPa and a total elongation greater than 4% over the part fabricated from steel 1, test A, as illustrated in Table 4.

A specimen of steel 1 that had been subjected to test A was dip coated with a zinc alloy, whereby the bath had the following composition: 0.208% Al and 0.014% Fe, the balance being zinc. An interface layer of $Fe_2Al_5(Zn)$ was thus formed, topped by a layer of zinc alloy having a composition almost identical to that of the bath. The coating obtained was adherent and had good coverage.

To provide additional information concerning the mechanical response of the steels designed according to embodiments of the invention, Table 4 summarizes the mechanical properties obtained when tests A to E were conducted:

TABLE 4

| Test | Steels | Elastic limit (MPa) | Mechanical strength (MPa) | Elongation at fracture A% |
|---|---|---|---|---|
| A | 1 | 1376 | 1437 | 7.9 |
| B | 2 | 1930 | 1950 | 3.5 |
| C | 3 | 846 | 903 | 11.9 |
| D | 3 | 1048 | 1193 | 7.0 |
| E | 3 | 704 | 798 | 13.9 |

Test B does not conform to the embodiments of invention, on account of the use of a maraging grade which leads to insufficient elongation at fracture. In addition, the mechanical strength is high even before the stamping, which reduces the formability during stamping.

Test C performed with the steel produced by casting 3 does not correspond to the mechanical characteristics required by embodiments of the invention because the chemical composition does not make it possible to have all the technical characteristics specified and necessary to achieve an elastic limit of 1500 MPa with 4% total elongation. The carbon content is too high and the silicon and titanium contents do not make it possible to have the hardening precipitates specified by embodiments of the invention. Therefore elastic limit is therefore significantly less than 1300 MPa.

Tests D and E cover respectively the lower (400° C.) and upper (600° C.) limits for $T_{OA}$ in the specified range. None of these temperatures make it possible to achieve the target in terms of elastic limit because in this case, it is a question of a martensite tempering, for which the temperature increase in the range described will lead to a softening of the structure.

The embodiments of invention also make it possible to fabricate parts which can optionally be dip-coated or coated by electrolytic deposition and which have mechanical characteristics such that the elastic limit is greater than or equal to 1300 MPa and the elongation at fracture is greater than or equal to 4% after the hardening heat treatment. This heat treatment achieves stable and particularly high mechanical properties on the final part or in the area targeted to undergo the heat treatment in case of a tailored blank, for example.

These parts can also be used advantageously as safety, anti-intrusion or reinforcement parts for the construction of land motor vehicles, to cite only a few non-restrictive examples.

These parts can have a variable thickness as a result of welding with other steels or flexible rolling of the steel according to embodiments of, i.e. rolling of a single sheet between two rolling mill rolls with variable gap, making it possible to have at least two different thicknesses on this sheet upon completion of the rolling.

The invention claimed is:

1. A rolled steel sheet or blank having a chemical composition comprising, expressed in percent by weight:
C≤0.1%;
0.5%≤Mn≤7%;
0.5%≤Si≤3.5%;
0.5%≤Ti≤2%;
2%≤Ni≤7%;
Al≤0.10%;
Cr≤2%;
Cu≤2%;
Co≤2%;
Mo≤2%;
S≤0.005%;
P≤0.03%;
Nb≤0.1%;
V≤0.1%;
B<0.005%; and
N≤0.008%,
the levels of silicon and titanium being such that:

$$Si + Ti \geq 2.5\%, \text{ and}$$

$$\frac{Ti}{Si} \geq 0.3,$$

a remainder of the composition including iron and unavoidable impurities resulting from processing.

2. The rolled steel sheet or blank as recited in claim 1 wherein the chemical composition comprises, expressed in percent by weight:
C≤0.050%;
3≤Mn≤5%;

$1.0 \leq Si \leq 3.0\%$;
$0.5 \leq Ti \leq 1.5\%$;
$2.5 \leq Ni \leq 3.5\%$;
$Al \leq 0.10\%$;
$Cr \leq 1\%$;
$Cu \leq 0.05\%$;
$Co \leq 1\%$;
$Mo \leq 2\%$;
$S \leq 0.005\%$;
$P \leq 0.03\%$;
$Nb \leq 0.1\%$;
$V \leq 0.1\%$;
$B < 0.005\%$; and
$N \leq 0.008\%$,
the levels of silicon and titanium being such that:

$$Si + Ti \geq 2.5\%$$
$$\frac{Ti}{Si} \geq 0.3$$

the remainder of the composition consisting of iron and the unavoidable impurities resulting from processing.

3. A rolled steel sheet or blank having a chemical composition comprising, expressed in percent by weight:
$C \leq 0.1\%$;
$0.5\% \leq Mn \leq 7\%$;
$0.5\% \leq Si \leq 3.5\%$;
$0.5\% \leq Ti \leq 2\%$;
$2\% \leq Ni \leq 7\%$;
$Al \leq 0.10\%$;
$Cr \leq 2\%$;
$Cu \leq 2\%$;
$Co \leq 2\%$;
$Mo \leq 2\%$;
$S \leq 0.005\%$;
$P \leq 0.03\%$;
$Nb \leq 0.1\%$;
$V \leq 0.1\%$;
$B < 0.005\%$; and
$N \leq 0.008\%$,
the levels of silicon and titanium being such that:

$$Si + Ti \geq 2.5\%, \text{ and}$$
$$\frac{Ti}{Si} \geq 0.3,$$

a remainder of the composition including iron and unavoidable impurities resulting from processing; and
a microstructure comprising at least 95% martensite and intermetallic precipitates of $Fe_2TiSi$.

4. The steel part as recited in claim 3 wherein an area percentage of said intermetallic precipitates is between 1 and 5%.

5. The steel part as recited in claim 3 wherein an average radius of said intermetallic precipitates is between 1 and 10 nm.

6. The steel part as recited in claim 3 wherein an elastic limit of the steel part is greater than or equal to 1300 MPa and an elongation at fracture of the steel part is greater than or equal to 4%.

7. The steel part as recited in claim 3 further comprising a coating containing zinc, a zinc-based alloy or a zinc alloy.

8. The steel part as recited in claim 3 further comprising a coating containing aluminum, an aluminum-based alloy or an aluminum alloy.

9. A method for fabricating a steel part comprising:
procuring the rolled steel sheet as recited in claim 1, a microstructure of the rolled sheet comprising at least 1% surface percentage of intermetallic precipitates of type $Fe_2TiSi$;
cutting the rolled steel sheet to obtain a blank;
heating the blank to a first temperature $T\gamma$ for a first length of time $t_\gamma$ in a furnace to give the blank a fully austenitic structure;
stamping the blank in a tool at a second temperature to obtain a part, the second temperature being greater than a martensitic transformation temperature Ms; then
cooling the part at an average cooling rate $V_{refl}$ to a third temperature to form a martensitic matrix, the third temperature being below the martensitic transformation temperature Ms; and then
heating the steel part to a hold temperature $T_{OA}$ for a hold time $t_{OA}$ to give the steel part specified mechanical characteristics by precipitation of intermetallics of type $Fe_2TiSi$ between 1% and 5% surface percentage.

10. The method as recited in claim 9 wherein the first temperature $T\gamma$ is between 700 and 1200° C.

11. The method as recited in claim 9 wherein the first temperature $T\gamma$ is between 880 and 980° C.

12. The method as recited in claim 9 wherein the first length of time $t_\gamma$ is between 60 and 360 seconds.

13. The method as recited in claim 9 wherein the average cooling rate $V_{refl}$ is between 10 and 70° C./s.

14. The method as recited in claim 9 wherein the hold temperature $T_{OA}$ is between 400 and 600° C.

15. The method as recited in claim 9 wherein the hold time $t_{OA}$ is between 30 and 600 minutes.

16. The method as recited in claim 9 further comprising coating the part with zinc, a zinc alloy or a zinc-based alloy after the part is heated to the hold temperature $T_{OA}$ for the hold time $t_{OA}$.

17. The method as recited in claim 9 further comprising coating the part with aluminum, an aluminum alloy or an aluminum-based alloy after the part is heated to the hold temperature $T_{OA}$ for the hold time $t_{OA}$.

18. A method for fabricating a steel part comprising:
procuring the rolled steel sheet as recited in claim 1, a microstructure of the rolled sheet comprising at least 1% surface percentage of intermetallic precipitates of $Fe_2TiSi$;
cutting the rolled steel sheet to obtain a blank;
stamping the blank;
heating the blank to a first temperature $T\gamma$ for a first length of time $t_\gamma$ in a furnace to give the blank a fully austenitic structure;
removing the blank from the furnace;
stamping the blank in a tool at a second temperature to obtain a part, the second temperature being above a martensitic transformation temperature Ms;
cooling the part at an average cooling rate $V_{refl}$ to a third temperature below the martensitic transformation temperature Ms; and
heating the part to a hold temperature $T_{OA}$ for a hold time $t_{OA}$ to give the part specified mechanical characteristics by precipitation of intermetallics of type $Fe_2TiSi$ between 1% and 5% surface percentage.

19. The method as recited in claim 18 wherein the first temperature $T\gamma$ is between 700 and 1200° C.

20. The method as recited in claim 18 wherein the first temperature Tγ is between 880 and 980° C.

21. The method as recited in claim 18 wherein the first length of time $t_\gamma$ is between 60 and 360 seconds.

22. The method as recited in claim 18 wherein the average cooling rate $V_{refl}$ is between 10 and 70° C./s.

23. The method as recited in claim 18 wherein the hold temperature $T_{OA}$ is between 400 and 600° C.

24. The method as recited in claim 18 wherein the hold time $t_{OA}$ is between 30 and 600 minutes.

25. The method as recited in claim 18 further comprising coating the part with zinc, a zinc alloy or a zinc-based alloy after the part is heated to the hold temperature $T_{OA}$ for the hold time $t_{OA}$.

26. The method as recited in claim 18 further comprising coating the part with aluminum, an aluminum alloy or an aluminum-based alloy after the part is heated to the hold temperature $T_{OA}$ for the hold time $t_{OA}$.

27. A structural or safety part for a land motor vehicle comprising:
the steel part as recited in claim 3.

28. A rolled steel sheet or blank having a chemical composition consisting of, expressed in percent by weight:
C≤0.1%;
0.5%≤Mn≤7%;
0.5%≤Si≤3.5%;
0.5%≤Ti≤2%;
2%≤Ni≤7%;
Al≤0.10%;
Cr≤2%;
Cu≤2%;
Co≤2%;
Mo≤2%;
S≤0.005%;
P≤0.03%;
Nb≤0.1%;
V≤0.1%;
B<0.005%; and
N≤0.008%,
the levels of silicon and titanium being such that:

$$Si + Ti \geq 2.5\%, \text{ and}$$

$$\frac{Ti}{Si} \geq 0.3,$$

a remainder of the composition consisting of iron and unavoidable impurities resulting from processing.

\* \* \* \* \*